United States Patent [19]

Takayama

[11] Patent Number: 4,992,877
[45] Date of Patent: Feb. 12, 1991

[54] IMAGE PICKUP APPARATUS WITH SUPERVISION OF NOISE LEVEL DIFFERENCES BETWEEN FIELDS

[75] Inventor: Tsutomu Takayama, Kawasaki, Japan

[73] Assignee: Canon Kabushiki Kaishi, Tokyo, Japan

[21] Appl. No.: 322,402

[22] Filed: Mar. 13, 1989

[30] Foreign Application Priority Data

Mar. 16, 1988 [JP] Japan .................. 63-060603

[51] Int. Cl.⁵ .......... H04N 3/14; H04N 5/335
[52] U.S. Cl. .............. 358/213.15; 358/162; 358/163; 358/213.16
[58] Field of Search ............ 358/213.15, 213.16, 358/163, 162

[56] References Cited

U.S. PATENT DOCUMENTS

| | | | |
|---|---|---|---|
| 4,336,552 | 6/1982 | Tanaka | 358/162 |
| 4,510,528 | 4/1985 | Bergen | 358/163 |
| 4,541,014 | 9/1985 | Yagi | 358/162 |
| 4,559,558 | 12/1985 | Hosoya | 358/162 |
| 4,675,738 | 6/1987 | Okino | 358/213.16 |
| 4,746,985 | 5/1988 | Waldron | 358/162 |
| 4,814,811 | 3/1989 | Saito | 358/909 |

Primary Examiner—Donnie L. Crosland
Assistant Examiner—Kinfe-Michael Negash
Attorney, Agent, or Firm—Fitzpatrick, Cella, Harper & Scinto

[57] ABSTRACT

There is provided an image pickup apparatus having an image pickup element for dividing a photoelectrically converted video signal of one frame into first and second fields and for sequentially reading the fields out, wherein the apparatus has a suppression circuit to suppress the signal of a predetermined band in the video signal from the image pickup element by different magnitudes for the first and second fields.

14 Claims, 4 Drawing Sheets

IMAGE PICKUP APPARATUS WITH SUPERVISION OF NOISE LEVEL DIFFERENCES BETWEEN FIELDS

BACKGROUND OF THE INVENTION

1. Field of the Invention

The present invention relates to an image pickup apparatus for accumulating a still image of one frame and reading out the accumulated image.

2. Related Background Art

Hitherto, an interline type CCD or the like has been used as an image pickup element for dividing a still image of one frame into two fields and sequentially then reading out.

FIG. 1 is a diagram showing an arrangement of an interline type CCD which can be applied to the present invention. Reference numeral 41 denotes a photodiode; 42 indicates a switch consisting of an MOSFET; 43 a vertical transfer CCD; 44 a horizontal transfer CCD; and 45 an output amplifier.

It is now assumed that photoelectric conversion is executed by the photodiode 41 within a time which has been preset by mechanical shutter means or the like. Then, the photoelectrically converted signal charges are read out from the signal of the first field in a state in which the image pickup element is shut against the light by the shutter means. In this case, the signals of only the odd-number lines (the 1st, 3rd, . . . , (2n−1)th lines) are transferred to the vertical transfer CCD 43 through the switch 42 comprising an MOSFET. Further, the signals are transferred to the horizontal transfer CCD 44 every horizontal line by vertical transfer pulses $\phi V1$, $\phi V2$, $\phi V3$, and $\phi V4$. Then, the signals are transferred by horizontal transfer pulses $\phi H1$, $\phi H2$, $\phi H3$, and $\phi H4$ and are read out from the output amplifier 45 comprising a floating diffusion amplifier of two source follower type FETs. Next, in the case of reading out the signals of the second field, the signal charges of the even-number lines (the 2nd, 4th, . . . , 2nth lines) are read out in accordance with the same processes as mentioned above. In this manner, the image of one frame is divided into two fields and read out.

Such a conventional reading method has a problem that the dark current noise levels in the first and second fields differ. In other words, when considering the signal charges of the second field, the incident light is shut out by the shutter means for a period of time when the signal of the first field is read out. However, since the signal charges of the second field are held in the photodiode, the dark current increases by an amount corresponding to only such a period of time.

Consequently, there are problems that not only do the S/N ratios of the signals of the first and second fields differ, but also a difference occurs between the black levels, so that flicker occurs and it becomes very hard to see the still image.

SUMMARY OF THE INVENTION

The present invention is made to solve such problems and it is an object of the invention to provide an image pickup apparatus in which the difference between the dark current components for successive fields is eliminated and a still image without the occurrence of flicker can be obtained.

To accomplish the above object, an image pickup apparatus according to an embodiment of the invention has means for suppressing the signal of a predetermined band in a video signal from an image pickup element by magnitudes which differ in the first and second fields.

With the above construction of the invention, the magnitude of emphasis or suppression of the signal of a predetermined band in the video signal read out of the image pickup element is changed for the first and second fields, thereby remarkably reducing the influence due to the difference between the dark current components.

DESCRIPTION OF THE PREFERRED EMBODIMENTS

Figure 1:
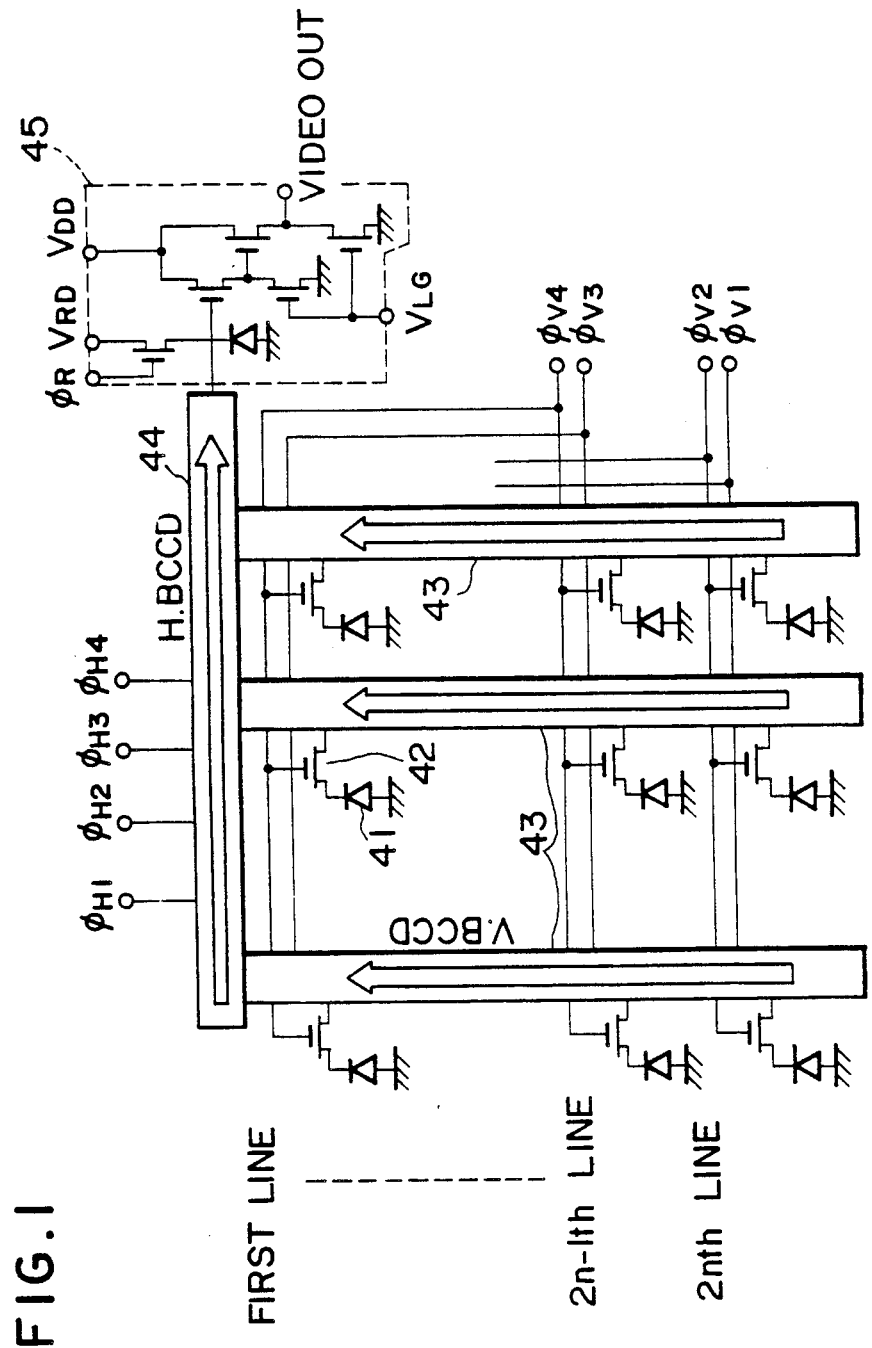
FIG. 1 is a diagram showing an arrangement of an image pickup element which is used in the present invention.
Figure 2:
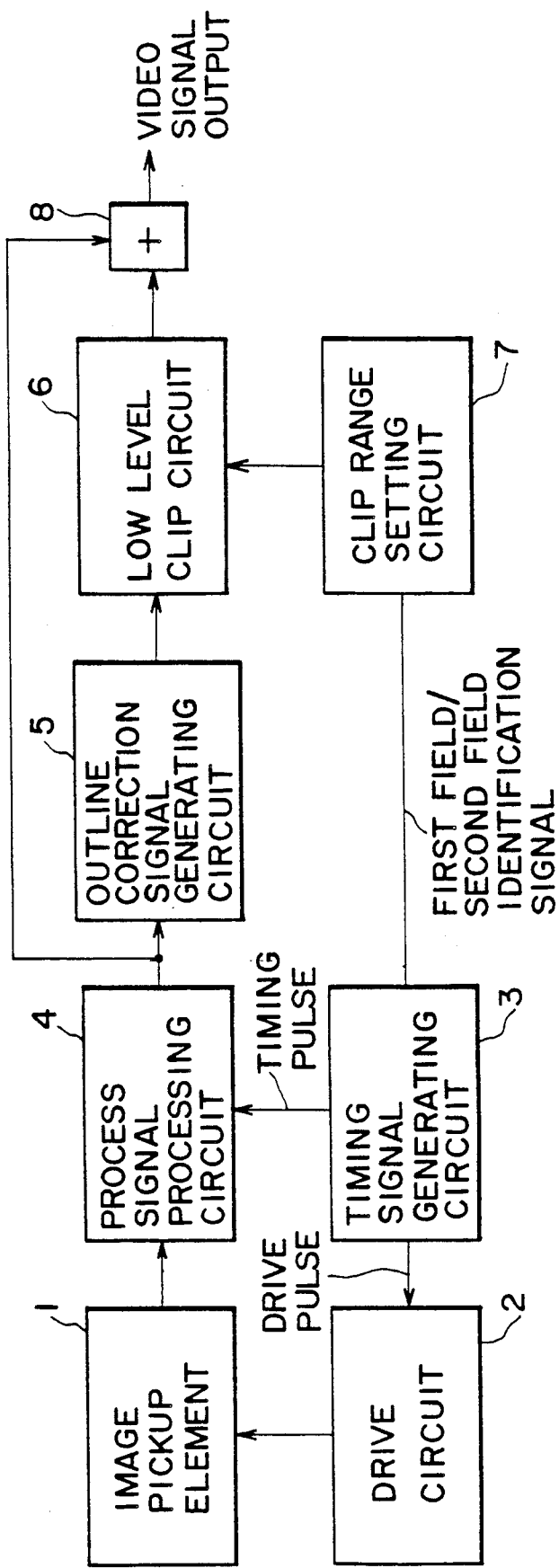
FIG. 2 is a block diagram showing an embodiment in an image pickup apparatus of the invention.

FIG. 2 is a block diagram showing an embodiment of the present invention. Reference numeral 1 denotes an image pickup element similar to that shown in FIG. 1; 2 indicates a drive circuit of the image pickup element 1; 3 a timing signal generating circuit; 4 a process signal processing circuit; 5 an outline correction signal generating circuit; 6 a low level clip circuit to clip the low level of an outline correction signal; 7 a clip range setting circuit to set a clip range of the low level clip circuit 6; and 8 an adder.

In the above construction, the image pickup element 1 operates as already described in connection with FIG. 1. A video signal is read out of the image pickup element 1 and is subjected to processes such as amplification, black level setting and the like by the process signal processing circuit 4. For instance, the outline correction signal generating circuit 5 can be constructed by a delay line and a subtracting circuit to calculate the difference between the signal delayed by the delay line and the undelayed signal. The outline correction signal generated from the outline correction signal generating circuit 5 is clipped by the low level clip circuit 6. However, in the invention, the clip range is set to different values for the first and second fields.

Figure 3:
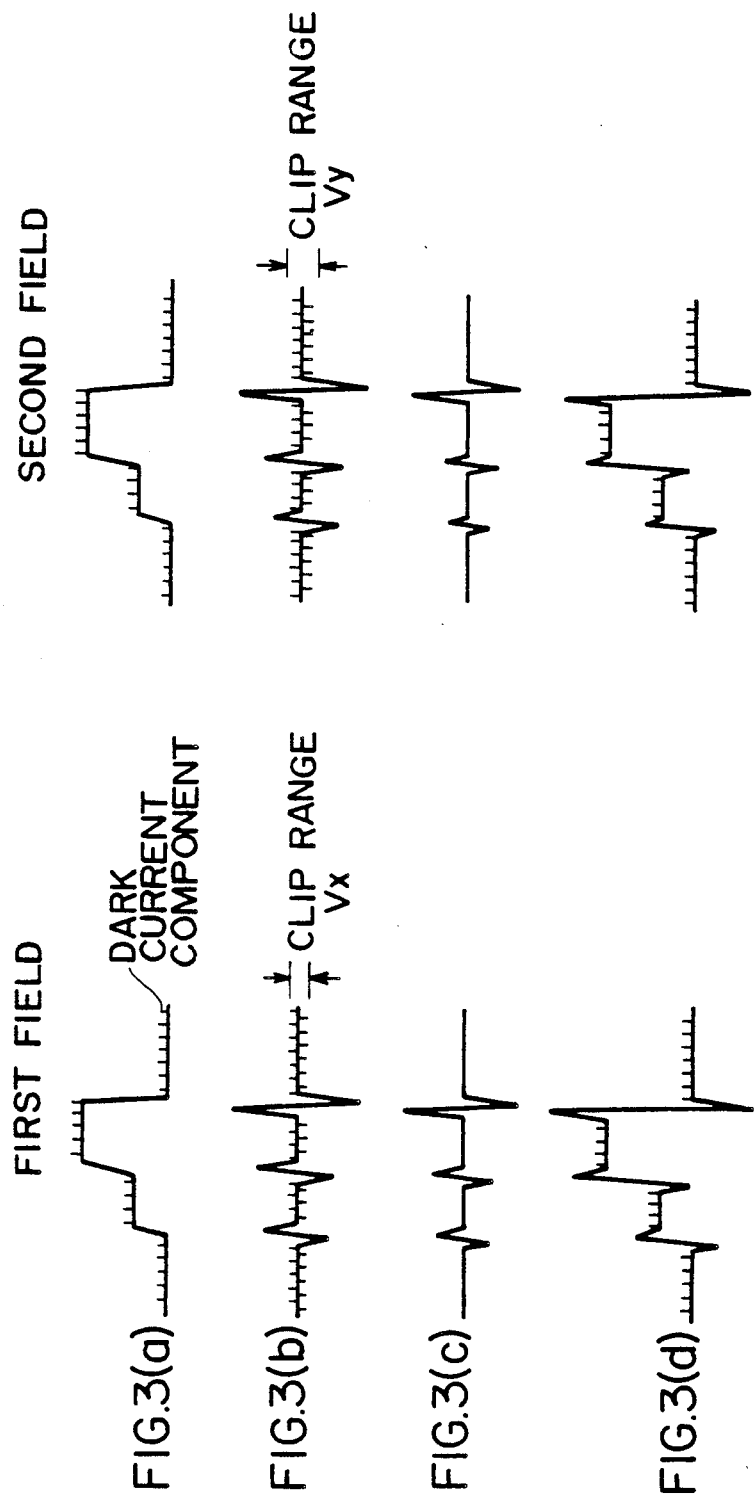
FIGS. 3(a)-3(d) are waveform diagram in each section in FIG. 2.

The setting of the clip range will now be described in detail with reference to FIGS. 3(a)-3(d). FIG. 3(a) shows a waveform diagram of the video signal before the outline correction is executed. The illustrated rough, stubbly component of the signal indicates a dark current component. The dark current component of the third field increases. On the other hand, FIG. 3(b) shows a waveform of the outline correction signal. In the portion where the signal level difference occurs, a waveform such as to emphasize such a difference is produced. FIG. 3(c) shows a waveform of the output signal of the low level clip circuit 6. As shown in FIG. 3(b), since the clip range is changed such that the clip range is set to $V_x$ for the first field and to $V_y$ for the second field, most of the dark current components of the first and second fields are eliminated. FIG. 3(d) shows a waveform of the signal which is obtained by adding the signal of FIG. 3(c) to the original signal of FIG. 3(a). In the case of the second field, the outline emphasis which is equivalent to that for the first field can be also executed without deteriorating the S/N ratio.

In this embodiment, by changing the clip range of the outline correction signal, the object of the invention is accomplished. However, for instance, the object of the invention can be also attained even by changing a ratio to suppress the outline correction signal.

On the other hand, the signal of a predetermined band in the video signal is not limited to the outline correction signal but may be the signal which is derived by merely passing it through a high pass filter.

In addition, the period of time for suppression of the signal of a predetermined band of the video signal is not limited to the period of time when such signal appears on the screen but may be a period of time, for instance, corresponding to the optically light shielded pixels in the horizontal or vertical blanking period. In such a case, when such a period of time is clamped at the post stage and the black level is set, it is possible to prevent the occurrence of the black level difference due to the dark current component difference of the first and second fields.

Figure 4:
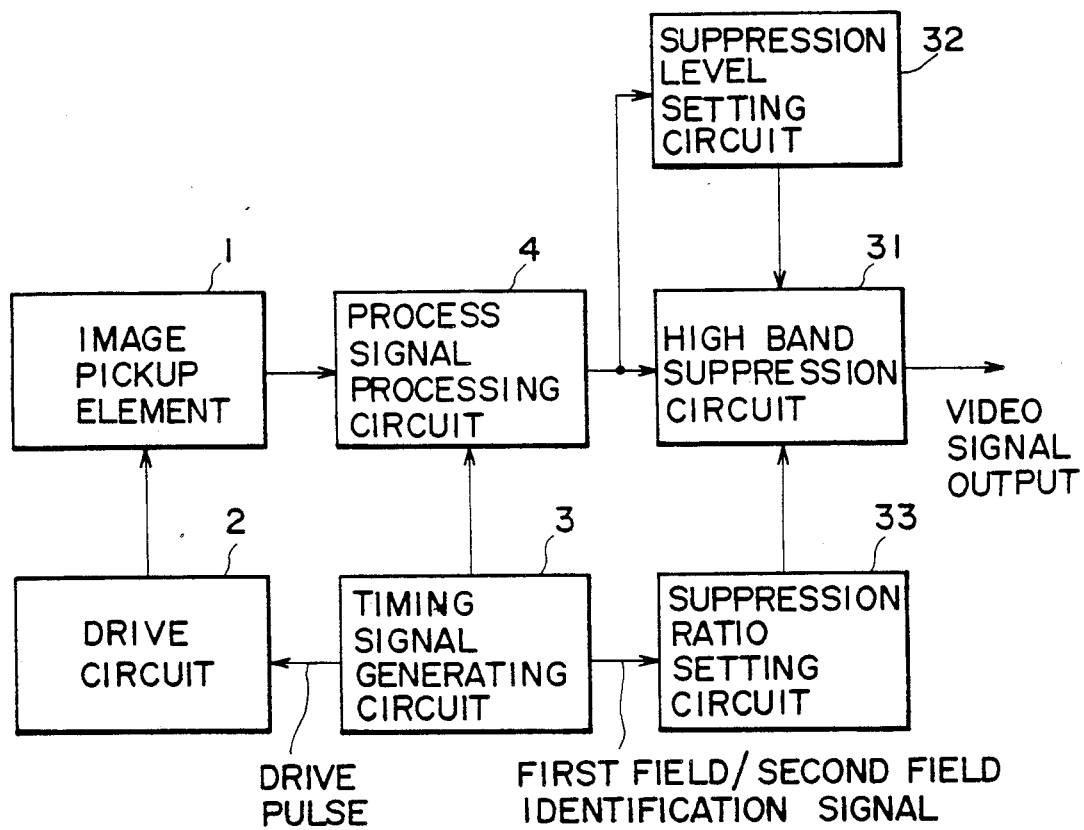
FIG. 4 is a block diagram showing another embodiment of the invention

FIG. 4 shows another embodiment of the invention. Reference numeral 31 denotes a high band suppression circuit; 32 indicates a suppression level setting circuit to set a suppression level in accordance with the video signal level; and 33 is a suppression ratio setting circuit to change a suppression ratio in accordance with a first-/second field identification signal from the timing signal generating circuit 3.

In this embodiment, since the dark current component of the second field in the low signal level portion in the video signal can be suppressed about two times lower than that of the first field, in the low luminance signal level portion where the dark current component in conspicuous, similar S/N ratios can be obtained for both of the first and second fields. On the other hand, since the dark current components are equal, it is possible to prevent the problem that they are integrated and become a black level difference.

On this other hand, although the embodiment has been shown with respect to the example in which the high band of the luminance signal is suppressed, the invention is not limited to the luminance signal but may involve, for instance, a color modulation signal. In such a case, a color balance difference in the low luminance portion which is due to the dark current component can be eliminated.

As described above, according to the invention, there is used a simple construction such that when the still image of one frame is divided into two fields and is read out, the magnitude the signal of a predetermined band in the video signal is changed every field so that the flicker which is due to the dark current component difference for every field can be eliminated.

We claim:

1. An image pickup apparatus comprising:
    (a) an image pickup element for dividing a photoelectrically converted video signal of one frame into first and second fields and sequentially reading out the first and second fields;
    (b) suppressing means for suppressing the signal of a predetermined band in the video signal from said image pickup element; and
    (c) control means for controlling said suppressing means so as to change characteristics of suppression with respect to the first and second fields, respectively.

2. An apparatus according to claim 1, wherein said suppressing means is a circuit to suppress a low signal level in the signal of the predetermined band in the video signal.

3. An apparatus according to claim 1, wherein said predetermined band is a high frequency band.

4. An apparatus according to claim 1, wherein said suppressing means includes clip means.

5. An apparatus according to claim 1, wherein said image pickup element includes an interline type CCD.

6. An image pickup apparatus according to claim 1, wherein said suppressing means includes outline emphasizing means for generating an outline correction signal in order to emphasize an outline of the video signal.

7. An apparatus according to claim 6, wherein the signal of the predetermined band in the video signal is said outline correction signal to emphasize an outline of the video signal.

8. An image pickup apparatus according to claim 1, wherein said control means suppresses a signal of the second field more strongly than a signal of the first field.

9. An image pickup apparatus comprising:
    (a) an image pickup element for dividing a photoelectrically converted video signal of one frame into first and second fields and sequentially reading out for only a preset same time;
    (b) exposing means for allowing an optical image to enter said image pickup element for only a photoelectric converting period of time; and
    (c) suppressing means for suppressing the video signal from the image pickup element by magnitudes which are different for the first and second fields.

10. An apparatus according to claim 9, wherein said suppressing means suppresses on outline emphasis signal of the video signal by the magnitudes which are different for the first and second fields.

11. An apparatus according to claim 9, wherein said suppressing means clips a low amplitude portion of a high band component in the video signal by amplitudes which are different for the first and second fields.

12. An apparatus according to claim 9, wherein said image pickup element includes an interline type CCD.

13. An image pickup apparatus according to claim 9, wherein said suppressing means includes outline emphasizing means for generating an outline correction signal in order to emphasize an outline of said video signal.

14. An image pickup apparatus according to claim 9, wherein said control means suppresses a signal of the second field more strongly than a signal of the first field.

* * * * *

UNITED STATES PATENT AND TRADEMARK OFFICE
CERTIFICATE OF CORRECTION

PATENT NO. : 4,992,877
DATED : February 12, 1991
INVENTOR(S) : TSUTOMU TAKAYAMA

Page 1 of 2

It is certified that error appears in the above-identified patent and that said Letters Patent is hereby corrected as shown below: On the title page:

AT [56] TITLE

"SUPERVISION" should read --SUPPRESSION--.

AT [73] ASSIGNEE

"Canon Kabushiki Kaishi," should read
--Canon Kabushiki Kaisha,--.

COLUMN 1

Line 3, "SUPERVISION" should read --SUPPRESSION--.
Line 14, "then" should be deleted.
Line 15, "reading out." should read
--reading them out.--.

COLUMN 2

Line 10, "DESCRIPTION," should read --DESCRIPTION--.

COLUMN 3

Line 41, "this" should read --the-- and
"the" should read --this--.
Line 52, "magnitude the" should read
--magnitude for suppressing the--.
Line 53, "field so" should read --field, so--.
Line 56, "We claim:" should read --What is claimed is:--.

UNITED STATES PATENT AND TRADEMARK OFFICE
CERTIFICATE OF CORRECTION

PATENT NO. : 4,992,877
DATED : February 12, 1991
INVENTOR(S) : TSUTOMU TAKAYAMA

Page 2 of 2

It is certified that error appears in the above-identified patent and that said Letters Patent is hereby corrected as shown below:

COLUMN 4

Line 43, "on" should read --an--.

Signed and Sealed this

Twenty-fourth Day of September, 1991

Attest:

HARRY F. MANBECK, JR.

Attesting Officer    Commissioner of Patents and Trademarks